(12) United States Patent
Balamuki et al.

(10) Patent No.: US 6,450,051 B1
(45) Date of Patent: Sep. 17, 2002

(54) SPRING LOADED TRANSMISSION AUXILIARY PISTON

(75) Inventors: Tom Balamuki; Landon Ball; Peggy Marie Garrett, all of Laurinburg, NC (US)

(73) Assignee: ZF Meritor, LLC, Laurinburg, NC (US)

( * ) Notice: Subject to any disclaimer, the term of this patent is extended or adjusted under 35 U.S.C. 154(b) by 3 days.

(21) Appl. No.: 09/653,793

(22) Filed: Sep. 1, 2000

(51) Int. Cl.[7] .............................................. F16H 59/00
(52) U.S. Cl. ....................................................... 74/335
(58) Field of Search ........................ 192/48.91, 69.91, 192/85 C; 74/335, 477; 477/908

(56) References Cited

U.S. PATENT DOCUMENTS

| 200,375 | A | * | 2/1878 | Crompton | 192/48.91 |
| 3,596,534 | A | * | 8/1971 | Logan | 192/48.8 |
| 4,280,583 | A | * | 7/1981 | Stieg | 192/46 X |
| 4,329,885 | A | * | 5/1982 | Morscheck | 74/339 |
| 4,735,109 | A | * | 4/1988 | Richards et al. | 74/339 X |
| 5,046,592 | A | * | 9/1991 | Mainquist et al. | 192/3.57 X |
| 5,573,096 | A | * | 11/1996 | Erlebach | 192/85 C |
| 5,846,159 | A | * | 12/1998 | Janecke et al. | 74/335 X |
| 6,202,812 | B1 | * | 3/2001 | Semke | 74/335 X |

* cited by examiner

Primary Examiner—Charles Marmor
Assistant Examiner—Roger Pang
(74) Attorney, Agent, or Firm—Carlson, Gaskey & Olds

(57) ABSTRACT

An auxiliary box for a heavy vehicle transmission includes a shift cylinder wherein fluid drives a piston in a first direction, and a spring drives a shift fork in an opposed second direction. If fluid is supplied to drive the piston in the first direction, a first gear is engaged in the auxiliary box, and if fluid is relieved the spring drives a shift fork to engage a second piston. The invention thus eliminates some of the fluid controls and components in the prior art.

4 Claims, 1 Drawing Sheet

SPRING LOADED TRANSMISSION AUXILIARY PISTON

BACKGROUND OF THE INVENTION

This invention relates to an auxiliary box transmission control wherein a spring biases a piston in a first direction and a fluid cylinder biases the piston in a second direction.

Transmissions for heavy vehicles such as trucks typically include a main transmission box which can be utilized to select a plurality of speed ratios. The main transmission box then feeds into an auxiliary box. The auxiliary box typically provides a range and/or a splitter function. The range and splitter functions are provided by selecting one of two gear ratios. A fluid cylinder typically drives a piston to engage one of the two gears. Typically, solenoids and fluid controls are required for each side of the piston such that the piston can be driven in a selected direction to achieve a desired gear ratio in the auxiliary box.

It would be desirable to reduce and simplify the components in the auxiliary box.

SUMMARY OF THE INVENTION

In a disclosed embodiment of this invention, a fluid cylinder for driving a gear ratio selection member in an auxiliary box of a transmission is driven in a first direction by fluid pressure biasing a piston. A spring is compressed when the piston is driven in the first direction. If the fluid pressure is relieved, the spring drives the gear selection member in an opposed direction. In this way, the present invention simplifies the standard auxiliary boxes for transmissions by eliminating the requirement of an extra control valve and related fluid connections. The system ensures the auxiliary box is driven to a desired position by controlling the relative force between the fluid force and the spring force.

These and other features of the present invention can be best understood from the following specification and drawings, the following of which is a brief description.

DETAILED DESCRIPTION OF A PREFERRED EMBODIMENT

Figure 1:
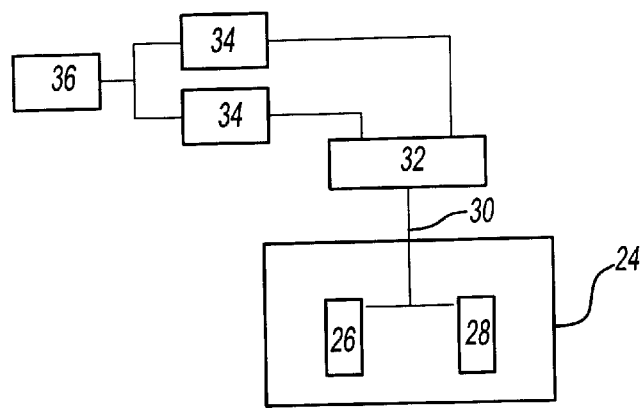
FIG. 1 is a schematic view of a prior art transmission.

FIG. 1 is a schematic view of a prior art transmission having a plurality of selectable speed ratios. An auxiliary box 24 may include a range and/or a splitter function. In either a range or splitter function a pair of gears 26 and 28 are utilized to provide a pair of optional speed ratios through the auxiliary box 24. As shown, a shift fork 30 is moved by a fluid cylinder 32 to selectively engage one of the gears 26 and 28. Typically, solenoid valves 34 control the flow of fluid to the cylinder 32 to drive the fork 30 in the desired position. A control 36 controls the valves 34 to selectively supply pressurized fluid to the appropriate side of the cylinder 32.

Figure 2:
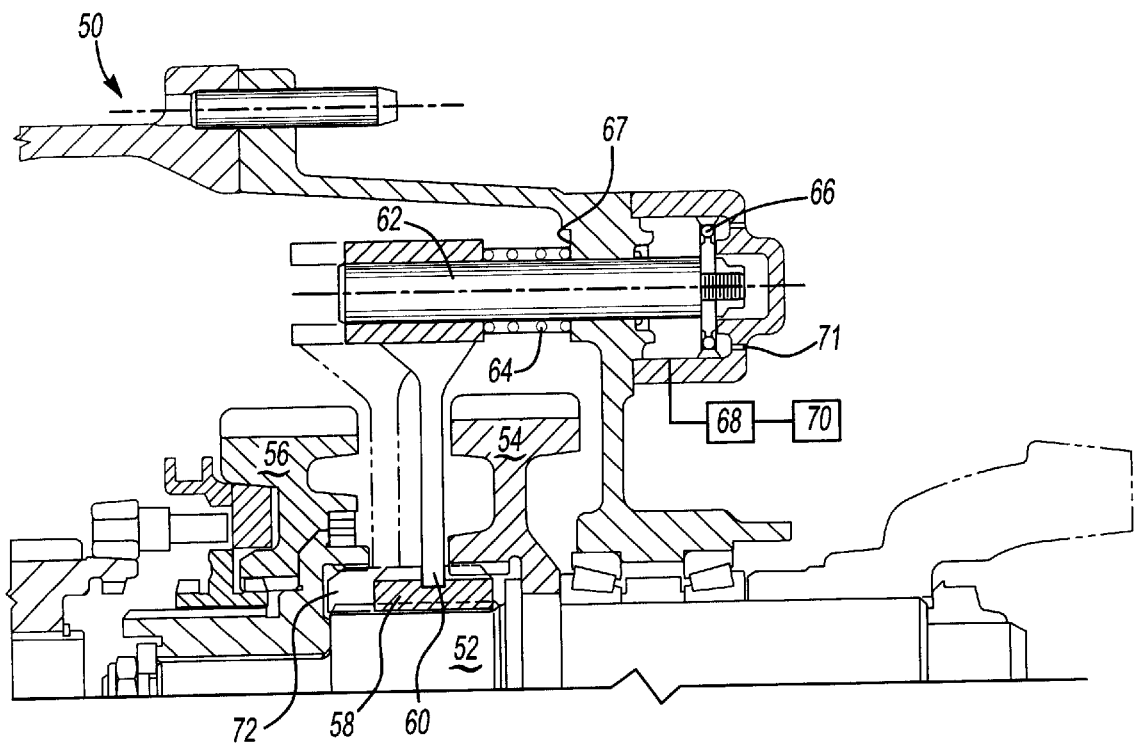
FIG. 2 shows an inventive transmission.

The present invention is illustrated in FIG. 2 and simplifies the system shown in FIG. 1 to eliminate one of the required valves. In the system 50 illustrated in FIG. 2, an output shaft 52 is selectively driven through one of a pair of gears 54 and 56. By selecting the appropriate one of the gears 54 and 56, a desired speed ratio is achieved at the output shaft 52. A collar 58 is moved to selectively engage the appropriate gear 54 and 56 and is moved through a shift fork 60. Shift fork 60 is driven by a shaft 62. A spring 64 is illustrated between a collar 65 on the fork 60 and a surface 67 on the auxiliary transmission housing. As shown, a piston 66 is attached to drive the shaft 62. In the position illustrated in FIG. 2 the piston 66 has been driven to the right by the supply of pressurized fluid through a valve 68 and from a source of pressurized fluid and control 70. A tap 71 allows air to escape from a chamber to the right of piston 66. In this position, the collar 58 engages the gear 54 as known. When pressure is released by opening the valve 68, the piston 66 is driven through the spring force 64 to the left from the position illustrated in FIG. 2, and the collar 58 engages the gear 56 as shown in phantom at 72.

This invention simplifies the relatively complex prior art control. Thus, benefits are provided with regard to the simplicity and cost of an auxiliary transmission box.

Although a preferred embodiment has been disclosed, a worker in this art would recognize that many modifications would come within the scope of this invention. For that reason, the following claims should be studied for the true scope and content of this invention.

What is claimed is:

1. A transmission comprising:

a main transmission box having an output shaft;

an auxiliary transmission box connected to said main transmission box and having first and second gears to selectively alter a gear ratio on said output shaft, said first and second gears being selectively connected to drive said output shaft by movement of a shift collar;

said shift collar being movable by a shift fork, said shift fork being movable in a first direction by a shift piston, said shift piston being movable within a fluid cylinder, and a source of pressurized fluid being delivered to one side of said shift piston to drive said shift piston in said first direction, and a control for controlling a valve to selectively supply said fluid pressure to said one side of said shift piston; and a spring driving said shin fork in a second direction opposed to said first direction, such that when fluid is supplied to said first side of said piston, said shift fork is moved to engage said first gear, and when pressure is relieved from said one side of said shift piston said spring drives said shift fork in said second direction to engage said second of said gears, said spring being mounted between said shift fork and a surface of a housing for said auxiliary transmission box.

2. A transmission as set forth in claim 1, wherein said first and second gears provide a splitter function.

3. A transmission as set forth in claim 1, wherein said spring solely drives said shift fork to engage said second of said gears.

4. A transmission as set forth in claim 3, wherein the force of said spring is selected such that it is adequate to drive said shift fork to engage said second of said gears.

* * * * *

UNITED STATES PATENT AND TRADEMARK OFFICE
CERTIFICATE OF CORRECTION

PATENT NO. : 6,450,051 B1
DATED : September 17, 2002
INVENTOR(S) : Balamuki et al.

Page 1 of 1

It is certified that error appears in the above-identified patent and that said Letters Patent is hereby corrected as shown below:

<u>Column 2,</u>
Line 45, "shin" should be -- shift --.

Signed and Sealed this

Twenty-fifth Day of February, 2003

JAMES E. ROGAN
*Director of the United States Patent and Trademark Office*